United States Patent [19]  [11] 3,873,336
Lambert et al. [45] Mar. 25, 1975

[54] A METHOD OF TREATING CALCIUM CARBONATE PAPER FILLER
[75] Inventors: Brian Paul Lambert, Hurst; James Lowes, Slough, both of England
[73] Assignee: Starch Products Limited, Langley, Slough, England
[22] Filed: June 30, 1972
[21] Appl. No.: 267,866

[30] Foreign Application Priority Data
July 1, 1971 United Kingdom............... 30968/71

[52] U.S. Cl............. 106/306, 106/214, 106/308 C, 117/100 B, 162/175, 162/181 A
[51] Int. Cl........................ C08b 27/04, C09c 1/02
[58] Field of Search............... 106/214, 306, 308 C; 162/175, 181 A; 117/100 B

[56] References Cited
UNITED STATES PATENTS

| 2,140,394 | 12/1938 | Ruff | 106/308 C |
| 2,949,397 | 8/1960 | Werner et al. | 106/308 C |
| 3,459,632 | 8/1969 | Caldwell et al. | 162/175 |
| 3,467,647 | 9/1969 | Benninga | 162/175 |
| 3,562,103 | 2/1971 | Moser et al. | 162/175 |
| 3,598,623 | 8/1971 | Powers et al. | 106/214 |

FOREIGN PATENTS OR APPLICATIONS
658,091   2/1963   Canada............................... 106/214

Primary Examiner—Allan Lieberman
Attorney, Agent, or Firm—Lawrence Rosen; E. Janet Berry

[57] ABSTRACT

The invention relates to improved mineral fillers for use in papermaking. The particulate filler is treated with polymeric material including both anionic and cationic groups, which coagulates or flocculates to coat the particles of filler and cause them to agglomerate. The flocculent filler has improved retention in a paper web, more importantly the invention enables calcium carbonate (for example chalk whiting) to be employed as a mineral filler because the coagulated polymer protects the mineral from the acidic alum in the paper stock. The preferred polymeric material is a mixture of anionic starch derivative and cationic starch derivative. The filler may be mixed with aqueous solutions of the starch derivatives or may be mixed with dry starch derivatives and stirred in water before use.

4 Claims, No Drawings

A METHOD OF TREATING CALCIUM CARBONATE PAPER FILLER

The present invention relates to improved fillers suitable for use in the manufacture of paper or other fibrous webs, and to a method of preparing such fillers.

Mineral fillers are commonly employed in the production of paper and related products, such as board and non-woven fabrics. China clay is frequently employed as a filler, but the cheaper and more widely available calcium carbonate for example chalk whiting, would be a useful alternative were it not for the tendency of calcium carbonate to react with the papermakers' alum used with rosin soap in conventional sizing.

The present invention provides coated mineral filler particles which exhibit improved retention in the fibrous web and which, in the case of calcium carbonate, have reduced chemical reactivity with alum.

The filler according to this invention comprises mineral filler particles coated or otherwise treated with a coagulated or precipitated composition comprising polymeric material including both anionic and cationic groups.

Although the treated fillers of this invention may be prepared as dry powders, when the treated particles are usually in the form of aggregates, it is also possible to employ them in the form of a suspension of coagulated filler/polymer particles or flocs which may be added directly to paper stock. Furthermore, the polymeric material may be mixed as a dry powder with the mineral filler and sold as such, ready for dilution with water, at which time the coagulation and coating of the particles takes place, and the invention thus resides also in such a dry mixture of the constituent materials. The constituents may also be supplied in the form of the dry, moist or slurried filler in association with a separately packed by appropriately weighed quantity of the polymeric material.

Although it is possible to employ amphoteric polymeric substances containing both anionic and cationic groups, which can be coagulated at the ioselectric point, it is at present preferred to employ a mixture of polymeric substances, natural or synthetic, at least one of which is anionic and at least one other of which is cationic.

The preferred fillers employ a coating composed of a mixture of an anionic starch derivative and a cationic starch derivative. By an anionic starch derivative is here meant a starch or starch derivative which contains substituent acid groups, such as carboxyl, phosphate, sulphate or sulphonate groups. Cationic starch derivatives may contain primary, secondary or tertiary amino groups or a quarternary ammonium group. The starches may be in a pregelled form i.e. cold water dispersible, or cold water soluble, or in the original granule form with which dispersion is obtained by heating in the presence of water in order to gelatinize the starch. The starches, in addition to being modified by virtue of the presence of the above substituent groups, may be dextrinised, oxidized, hydrolysed, etherified or esterified, and they may also be cross-linked.

It has been found that the degree of substitution of anionic and cationic starches is not critical, within the normal limits for such products, but it is preferred to use an amount of anionic starch not less than that of cationic. Preferably the weight ratio of anionic to cationic starch is from 1:1 to 2:1. It is further preferred to use at least 4% total weight of anionic and cationic starch based on the weight of filler particles. 5% is preferred, but no further advantage is gained by using quantities above 5% although there is no critical upper limit.

In the treated fillers of this invention the polymeric material may also be treated with an insolubilizing agent, for example glyoxal in the case of starch.

According to another aspect of the present invention there is provided a method of treating particles of a filler for use in a fibrous web which comprises mixing the particles with cationic and anionic water-soluble or water-dispersible polymeric material in aqueous suspension. Such polymeric material is precipitated onto the particles to give flocs. Moreover, flocs obtained from such polymer-treated filler can be given a further treatment with an insolubilizing compound.

In the preferred practice of the method of this invention, an aqueous dispersion of the filler is prepared and to this a cationic and an anionic water-soluble or water-dispersible polymer are added in either order or together. They may be added as dry powders, as dispersions, or in solution. A mixture of dry filler with the dry water-soluble or water-dispersible polymers may be prepared, and this mixture is then mixed into water with stirring until a smooth suspension is obtained. By interaction of the two polymers an organic floc is produced incorporating the filler particles and this flocculation is accelerated by the addition of a precipitant such as papermakers' alum.

Precipitation or separation of flocs may be observed on dilution with water, or the addition to the filler/polymer suspension of a precipitant solution, or on adding the filler/polymer suspension to a precipitant solution, which may be paper stock containing previously added or simultaneously added precipitant, e.g. resin size and alum. Alternatively, alum may be added before the aqueous suspension of the precipitated floc is added to a paper system, either batchwise of continuously. It is preferred to add alum rapidly to a suspension of whiting with anionic and cationic starch derivatives. In this way better protection of the whiting against acid attack is achieved, perhaps because the alum reacts rapidly with the starch floc before there is time for the calcium carbonate to be attacked. If a suspension of whiting and starch floc is added to acidic paper stock, a slow reaction of the whiting may occur.

The following are examples of the preferred practice of this invention.

EXAMPLE 1.

Solutions were made of 2.5g of a commercially available anionic starch having a degree of substitution of 0.05 carboxymethyl groups and 2.5g of a commercially available cationic starch having a degree of substitution of 0.035 of diethylamino ethyl groups, in respective 33.3ml volumes of tap water in the cold. These solutions were mixed together and 100g natural chalk whiting BWF Grade 40 was mixed in mechanically. An apparently smooth dispersion resulted. On addition of water or on pouring with stirring into a solution of papermakers' alum, flocs were produced which showed resistance to acid attack.

EXAMPLE 2.

A suspension was made with the starch derivatives as in Example 1, and a solution of papermakers' alum was added in small amounts to give pH 7.0, whereupon flocs formed. Paper handsheets were prepared using bleached sulphite pulp with 2% alum to the pulp and varying amounts of filler in the form of the above flocs. Filler retention and paper strength was good and the sheet was smooth.

EXAMPLE 3.

Dry chalk whiting was mixed with 2.5% of a commercially available anionic starch having a degree of substitution of 0.05 carboxymethyl groups and 2.5% of a commercially available cationic starch having a degree of substition of 0.035 of diethylamino ethyl groups, both in dry form. An apparently smooth suspension was prepared in tap water at 60% solids content by mixing. Thos formed flocs on dilution or treatment with a precipitant; these flocs showed resistance to acid attack.

It will be apparent that the invention can be used with advantage in the case of other alum-reactive fillers than whiting, for example dolmite or ground limestone.

What we claim is:

1. A method of treating particles of calcium carbonate filler to reduce its sensitivity to papermakers' alum which comprises dissolving cationic and anionic starch derivatives in water to form an aqueous solution, mixing said filler particles with said starch derivatives in the resulting aqueous solution, wherein the total weight of the anionic and cationic starch derivatives is at least about 4% of the weight of the filler particles, and wherein the weight ratio of anionic to cationic starch is from 1:1 to 2:1, and depositing said starch derivatives in mutually coagulated admixture on said particles.

2. A method according to claim 1 wherein separate aqueous solutions of said anionic and cationic starches are prepared and said solutions are mixed with the filler particles prior to deposition.

3. A method according to claim 1 in which a dry mixture of said anionic and cationic starches and the filler particles is stirred in water prior to deposition.

4. A method according to claim 1 in which the starches are treated with glyoxal to insolubilize them.

* * * * *